US009380233B2

(12) United States Patent
Yang et al.

(10) Patent No.: US 9,380,233 B2
(45) Date of Patent: Jun. 28, 2016

(54) IMAGE SENSOR

(71) Applicant: SAMSUNG ELECTRONICS CO., LTD., Suwon-Si, Gyeonggi-Do (KR)

(72) Inventors: Han Yang, Seoul (KR); Kyoung Min Koh, Hwaseong-si (KR); Yong Lim, Hwaseong-si (KR); Shin Hoo Kim, Suwon-si (KR); Ju Ha Kim, Yongin-si (KR); Seung Jin Lee, Yongin-si (KR); Jae Jin Jung, Seoul (KR); Kee Moon Chun, Seongnam-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 14/185,081

(22) Filed: Feb. 20, 2014

(65) Prior Publication Data

US 2014/0240569 A1    Aug. 28, 2014

(30) Foreign Application Priority Data

Feb. 27, 2013  (KR) .......................... 10-2013-0021554

(51) Int. Cl.
  *H04N 5/361*  (2011.01)
(52) U.S. Cl.
  CPC ..................... *H04N 5/361* (2013.01)
(58) Field of Classification Search
  CPC ............................. H04N 5/2176; H04N 5/361
  USPC .................................. 348/241, 243, 245, 308
  See application file for complete search history.

(56) References Cited

U.S. PATENT DOCUMENTS 7,135,665 B2    11/2006  Matsuda et al.
7,427,735 B2 *   9/2008  Eskerud ................. H04N 5/374
                                              250/208.1

(Continued)

FOREIGN PATENT DOCUMENTS

JP   2004-357135   12/2004
JP   2006-067010    3/2006

(Continued)

OTHER PUBLICATIONS

Nakamura, Junichi, Extract from Literature: Image Sensor and Signal Processing for Digital Still Cameras, Tayler & Francis (publisher) 2006.

*Primary Examiner* — Lin Ye
*Assistant Examiner* — Chriss Yoder, III
(74) *Attorney, Agent, or Firm* — F. Chau & Associates, LLC

(57) ABSTRACT

An image sensor includes a pixel array including at least one active pixel and at least one line-optical black (L-OB) pixel arranged in a matrix including first to $n^{th}$ rows and first to $m^{th}$ columns, the pixel array configured to output a pixel signal and a dark-level offset signal in units of columns during a read-out operation in one of the first to $n^{th}$ rows; a row driver configured to output a selection control signal to the first to $n^{th}$ rows; and an analog-to-digital converter (ADC) block configured to digitize the pixel signal and the dark-level offset signal. In the pixel array, a dark-level offset signal is simultaneously output from an L-OB pixel in another row during the read-out operation in one of the first to $n^{th}$ rows. Here, 'n' and 'm' each denote an integer that is equal to or greater than '2'.

28 Claims, 13 Drawing Sheets

(56) References Cited

U.S. PATENT DOCUMENTS

| | | |
|---|---|---|
| 7,724,294 B2 | 5/2010 | Ahn et al. |
| 7,999,866 B2 | 8/2011 | Sonoda et al. |
| 8,072,512 B2 | 12/2011 | Lee et al. |
| 8,077,227 B2* | 12/2011 | Mo et al. .................. 348/243 |
| 8,111,306 B2 | 2/2012 | Kuruma et al. |
| 2006/0114342 A1* | 6/2006 | Egawa ..................... 348/241 |
| 2007/0019085 A1* | 1/2007 | Suzuki ............. H04N 5/361 |
| | | 348/241 |
| 2008/0012966 A1* | 1/2008 | Beck et al. ............... 348/245 |
| 2008/0239124 A1* | 10/2008 | Mori et al. ............... 348/308 |
| 2009/0091641 A1 | 4/2009 | Hattori |
| 2010/0085448 A1* | 4/2010 | Fukuoka ................... 348/241 |
| 2010/0283875 A1 | 11/2010 | Naskali et al. |
| 2012/0212657 A1* | 8/2012 | Mo ..................... H04N 5/378 |
| | | 348/300 |

FOREIGN PATENT DOCUMENTS

| | | |
|---|---|---|
| JP | 2007-018458 | 1/2007 |
| JP | 2009-135787 | 6/2009 |
| JP | 2010-034744 | 2/2010 |
| JP | 2011-004321 | 1/2011 |
| KR | 1020050080814 | 8/2005 |

* cited by examiner

IMAGE SENSOR

CROSS-REFERENCE TO RELATED APPLICATIONS

This application claims priority to Korean Patent Application No. 10-2013-0021554, filed on Feb. 27, 2013, in the Korean Intellectual Property Office, the disclosure of which is incorporated by reference in its entirety herein.

BACKGROUND

1. Discussion of Related Art

Exemplary embodiments of the inventive concept relate to image sensors, and more particularly, to an image sensor capable of reducing noise in an image by controlling an operation of a pixel array.

2. Technical Field

A complementary metal-oxide semiconductor (CMOS) image sensor is a solid-state imaging device using a CMOS. The CMOS image sensor is cheaper to manufacture, is smaller in size, and thus consumes less power than a charge-coupled device (CCD) image sensor that includes a high-voltage analog circuit. The CMOS image sensor has been widely installed in household products including portable devices such as smart phones and digital cameras.

However, the resolution of CMOS image sensor is typically less than a CCD image sensor. Further, image quality of images produced by the CMOS image sensor may be degraded since noise is generated by devices included in the CMOS image sensor when the CMOS image sensor operates. Thus, there is a need for an image sensor that can produce an image with a higher quality.

SUMMARY

According to an exemplary embodiment of the inventive concept, there is provided an image sensor including a pixel array that includes at least one active pixel and at least one line-optical black (L-OB) pixel arranged in a matrix including first to $n^{th}$ rows and first to $m^{th}$ columns, and configured to output a pixel signal and a dark-level offset signal in units of columns during a read-out operation in one of the first to $n^{th}$ rows; a row driver configured to output a selection control signal to the first to $n^{th}$ rows; and an analog-to-digital converter (ADC) block configured to digitize the pixel signal and the dark-level offset signal. In the pixel array, a dark-level offset signal is simultaneously output from an L-OB pixel in another row during the read-out operation in one of the first to $n^{th}$ rows. 'n' and 'm' each denote an integer that is equal to or greater than '2'.

In an exemplary embodiment, when dark-level offset signals are simultaneously output from at least two L-OB pixels present in different rows and the same column, the pixel array outputs an average of values of the dark-level offset signals.

In an exemplary embodiment, wherein the at least two L-OB pixels that are present in the same column and that simultaneously output the dark-level offset signals are located in adjacent rows.

In an exemplary embodiment, the at least one L-OB pixel does not include a photo diode In an exemplary embodiment, the at least one L-OB pixel includes a light-shielding film on a top surface thereof.

In an exemplary embodiment, the ADC block includes a plurality of ADC units connected to one of the first to $m^{th}$ columns.

In an exemplary embodiment, the at least one active pixel and the at least one L-OB pixel each have a three-transistor (3T) structure, a four-transistor (4T) structure, or a five-transistor (5T) structure.

According to an exemplary embodiment of the inventive concept, there is provided an image sensor including a pixel array that includes at least one active pixel and at least one line-optical black (L-OB) pixel arranged in a matrix including first to $n^{th}$ rows and first to $m^{th}$ columns, and configured to output a pixel signal and a dark-level offset signal in units of columns during a read-out operation in one of the first to $n^{th}$ rows; a row driver configured to output a selection control signal to the first to $n^{th}$ rows; and an analog-to-digital converter (ADC) block configured to digitize the pixel signal and the dark-level offset signal. In the pixel array, a dark-level offset signal is simultaneously output from an L-OB pixel in another row during the read-out operation in one of the first to $n^{th}$ rows. Only L-OB pixels are present in one of the first to $n^{th}$ rows. 'n' and 'm' each denote an integer that is equal to or greater than '2'.

In an exemplary embodiment, only active pixels or L-OB pixels are present in each of the first to $m^{th}$ columns.

In an exemplary embodiment, an output of one of the first to $n^{th}$ rows in which only the L-OB pixels are present is supplied to one of the first to $m^{th}$ columns in which only L-OB pixels are present.

In an exemplary embodiment, when dark-level offset signals are simultaneously output from at least two L-OB pixels present in different rows and the same column, the pixel array may output an average of values of the dark-level offset signals.

In an exemplary embodiment, the at least one L-OB pixel includes a light-shielding film on a top surface thereof.

In an exemplary embodiment, the ADC block includes a plurality of ADC units connected to one of the first to $m^{th}$ columns.

In an exemplary embodiment, the image sensor further includes a correlated double sampling (CDS) block configured to perform CDS on the pixel signal and the dark-level offset signal output in units of columns from the pixel array, and transmit a result of the performing to the ADC block; a buffer configured to temporarily store, amplify, and output the digitized pixel signal and dark-level offset signal; and a timing generator configured to generate a clock signal and a control signal, and transmit the clock signal and the control signal to the row driver and the ADC block.

According to an exemplary embodiment of the inventive concept, there is provided an image process system including the image sensor; and an image signal processor configured to receive the amplified digitized pixel signal and dark-level offset signal from the buffer, and remove row noise by subtracting the amplified digitized dark-level offset signal from the amplified digitized pixel signal.

According to an exemplary embodiment of the inventive concept, there is provided an image sensor having a pixel array and a controller. The pixel array includes at least four pixels arranged in rows and columns. The pixels in a first one of the columns are configured to be unresponsive to light and output a dark-level offset signal when activated. The pixels in a second one of the columns are configured to be responsive to light and output a pixel signal when activated. The controller is configured to perform a read-out operation on one of the rows by activating the pixels of the one row, and activating one of the pixels that is unresponsive to light located in a second other one of the rows.

In an exemplary embodiment, all the activated pixels are activated at substantially the same time. In an exemplary embodiment, the image sensor includes an analog-to-digital converter configured to digitize the pixel signal and the dark-level offset signal. In an exemplary embodiment, the pixels responsive to light each comprise a photo diode and the pixels unresponsive to light either exclude the photo diode or include a light shield. In an exemplary embodiment, the image sensor includes a circuit configured to perform a correlated double sampling on the pixel signal and the dark-level offset signal. In an exemplary embodiment, an image process system includes the image sensor and an image signal processor configured to receive the digitized pixel signal and dark-level offset signal, and remove noise by subtracting the digitized dark-level offset signal from the digitized pixel signal.

According to an exemplary embodiment of the inventive concept, there is provided an image sensor including a pixel array and a controller. The pixel array includes at least four pixels arranged in rows and columns. The pixels in a first one of the rows sequentially include a first pixel configured to be unresponsive to light and a second pixel configured to be responsive to light. The pixels in a second one of the rows are configured to output a pixel signal and the pixels unresponsive to light are configured to output a dark-level offset signal, when activated respectively. The controller is configured to perform a read-out operation on the first row by activating all the pixels of the first row and activating all of the pixels of the second row.

In an exemplary embodiment, all the activated pixels are activated at substantially the same time. In an exemplary embodiment, the image sensor includes an analog-to-digital converter configured to digitize the pixel signal and the dark-level offset signal. In an exemplary embodiment, the pixels responsive to light each comprise a photo diode and the pixels unresponsive to light either exclude the photo diode or include a light shield. In an exemplary embodiment, the image sensor includes a circuit configured to perform a correlated double sampling on the pixel signal and the dark-level offset signal. In an exemplary embodiment, an image process system includes the image sensor and an image signal processor configured to receive the digitized pixel signal and dark-level offset signal, and remove noise by subtracting the digitized dark-level offset signal from the digitized pixel signal.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION

Figure 1:
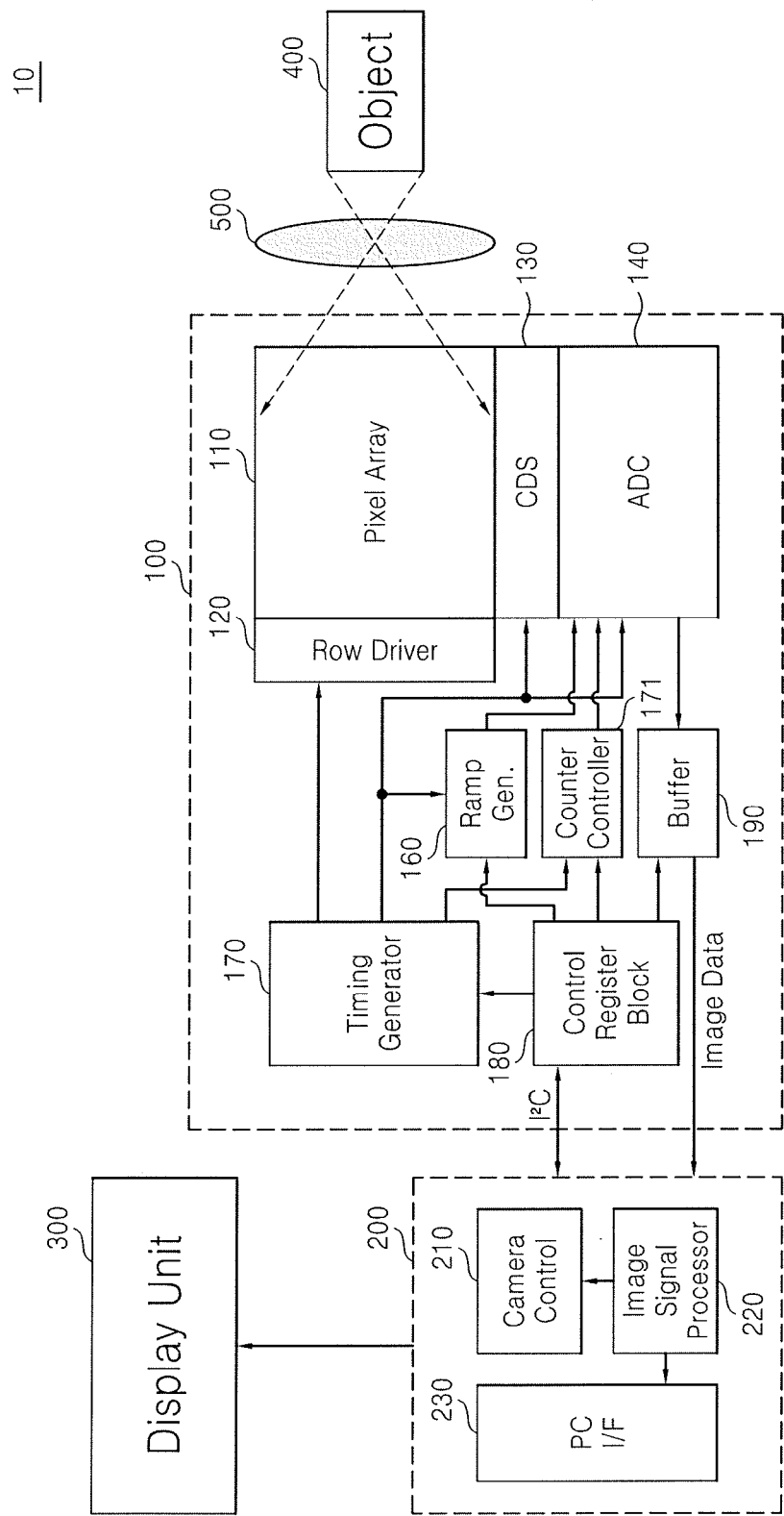
FIG. 1 is a block diagram of an image process system including an image sensor according to an exemplary embodiment of the inventive concept.

The inventive concept now will be described more fully hereinafter with reference to the accompanying drawings, in which exemplary embodiments of the invention are shown. This invention may, however, be embodied in many different forms and should not be construed as limited to the exemplary embodiments set forth herein. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. As used herein, the singular forms "a", "an" and "the" are intended to include the plural forms as well, unless the context clearly indicates otherwise.

FIG. 1 is a block diagram of an image process system 10 including an image sensor 100 according to an exemplary embodiment of the inventive concept.

Referring to FIG. 1, the image process system 10 according to an embodiment of the inventive concept includes the image sensor 100, an image processor (e.g., a digital signal processor (DSP)) 200, a display unit 300, and a lens 500.

The image sensor 100 includes a pixel array 110, a row driver 120, a correlated double sampling (CDS) block 130, an analog to digital converter (ADC) 140, a ramp signal generator 160, a timing generator 170, a counter controller 171, a control register block 180, and a buffer 190.

The image sensor 100 senses an image of an object 400 captured via the lens 500, under control of the DSP 200. The DSP 200 may output an image to the display unit 300, which is sensed by and output from the image sensor 100. Examples of the display unit 300 may include various devices capable of outputting an image. For example, the display unit 300 may be embodied as a computer (e.g., a tablet computer, a personal computer, a desktop computer, a laptop computer, etc), a mobile phone (e.g., a smartphone), or an electronic device having a camera.

The DSP 200 includes a camera control 210, an image signal processor 220, and a personal computer interface (PC I/F) 230. The camera control 210 controls the control register block 180. The camera control 210 may control the image sensor 100, e.g., the control register block 180, using an I²C (inter-integrated circuit) but the inventive concept is not limited thereto. I²C is a multimaster serial single-end computer bus used for attaching peripherals to a motherboard, embedded system, smartphone, etc.

The image signal processor 220 receives image data, which is an output signal of the buffer 190, processes/handles the image data, and outputs the processed/handled image data to the display unit 300 via the PC I/F 230.

Although FIG. 1 illustrates that the image signal processor 220 is included in the DSP 200, the location of the image signal processor 220 may vary. For example, the image signal processor 220 may be included in the image sensor 100.

The pixel array 110 includes a plurality of optical-to-electrical (OE) conversion devices such as a photo diode and a pinned photo diode. A photo diode is a type of photo detector capable of converting light into either current or voltage. A diode designed for use as a photo diode can use a PIN junction rather than a p-n junction. The pixel array 110 generates an image signal by sensing light and converting the light into an electrical signal using the plurality of OE conversion devices.

The timing generator 170 controls operations or timings of at least one of the row driver 120, the ADC 140, the ramp signal generator 160, and the counter controller 171 by outputting a control signal or a clock signal thereto. The control register block 180 outputs a control signal to at least one of the ramp signal generator 160, the timing generator 170, the counter controller 171, and the buffer 190 so as to control operations thereof. In this case, the control register block 180 is operated under control of the camera control 210.

The counter controller 171 receives the control signal from the control register block 180 and transmits a counter control signal CCS to a plurality of counters (not shown) included in the ADC 140 so as to control operations of the plurality of counters.

The row driver 120 drives the pixel array 110 in units of rows. For example, the row driver 120 generates a transmission control signal for controlling transmission transistors of each unit pixel of the pixel array 110, a reset control signal for controlling a reset transistor, a selection control signal for controlling a selection transistor, etc. Also, the pixel array 110 transmits pixel signals (e.g., a reset signal and an image signal) output from a row selected by a row selection signal provided from the row driver 120, to the CDS 130. The CDS 130 may perform CDS on the received reset signal and image signal.

The ADC 140 compares a ramp signal Vramp output from the ramp signal generator 160 with a CDS signal output from the CDS 130, outputs a comparison result signal, counts the comparison result signal, and outputs a count result signal to the buffer 190. The ramp signal generator 160 may be a function generator that increases or decreases its output voltage to a specific value, called a ramp. For example, the voltage output by the generator 160 is typically not constant (e.g., has a non-zero slope).

The buffer 190 temporarily stores a digital signal output from the ADC 140, senses, amplifies, and outputs the digital signal. In this case, the buffer 190 may include a plurality of column memory blocks (e.g., static random access memories (SRAMs)) in respective columns to temporary store the digital signal, and a sense amplifier (SA) to sense and amplify the digital signal output from the ADC 140.

FIGS. 2A to 2E are circuit diagrams of examples of unit pixels, which may be included in the pixel array 110 of the image sensor 100 of FIG. 1.

Figure 2A:
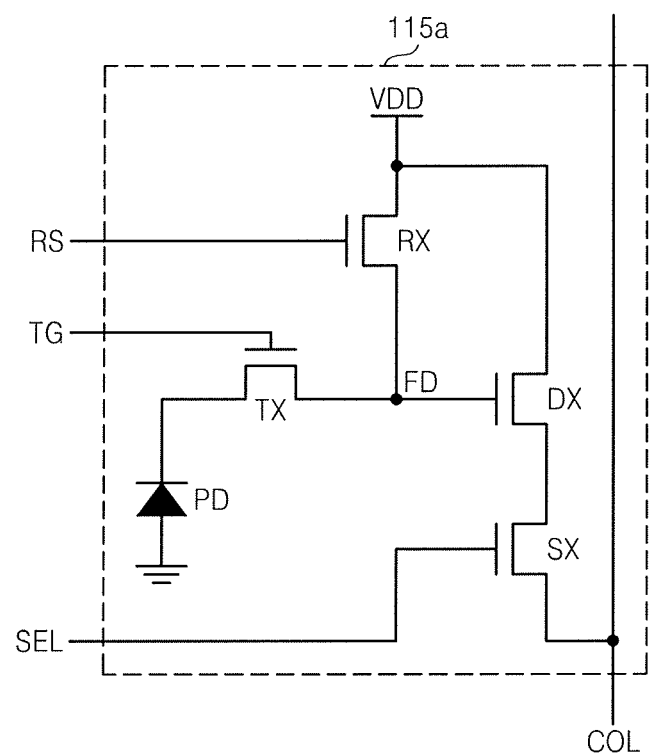
FIGS. 2A to 2E are circuit diagrams of examples of unit pixels, which may be included in a pixel array of the image sensor of FIG. 1.

Referring to FIG. 2A, a unit pixel 115a includes a photo diode PD, a transfer transistor Tx, a floating diffusion node FD, a reset transistor Rx, a drive transistor Dx, and a selection transistor Sx.

Here, the photo diode PD is an example of an OE conversion device, and may include at least one among a photo transistor, a photo gate, a pinned photo diode (PPD), and a combination thereof.

Although FIG. 2A illustrates a unit pixel 115a having a four-transistor (4T) structure including one photo diode PD and four MOS transistors Tx, Rx, Dx, and Sx, the inventive concept is not limited thereto and embodiments of the inventive concept may be applied to various circuits including at least three transistors (including the drive transistor Dx and the selection transistor Sx) and one photo diode PD.

An operation of the unit pixel 115a will now be described. The photo diode PD generates an optical charge that varies according to the intensity of light incident on the object 400. The transfer transistor Tx transmits the optical charge to the floating diffusion node FD according to a transfer control signal TG output from the row driver 120. For example, the transfer control signal TG can be applied to a gate of the transfer transistor TX to enable the transfer transistor TX to provide the optical charge to a floating diffusion node FD.

The drive transistor Dx may amplify and transmit the optical charge to the selection transistor Sx, based on electric potentials according to optical charges accumulated in the floating diffusion node FD.

The selection transistor Sx includes a drain terminal connected to a source terminal of the drive transistor Dx, and outputs a pixel signal to a column line COL connected to the unit pixel 115a according to a selection signal SEL output from the row driver 120.

The reset transistor Rx resets a voltage of the floating diffusion node FD to a power supply voltage VDD according to a reset control signal RS output from the row driver 120. In an exemplary embodiment, the power supply voltage is different from the voltage of the floating diffusion node FD.

Other embodiments of a unit pixel are illustrated in FIGS. 2B to 2E.

Figure 2B:
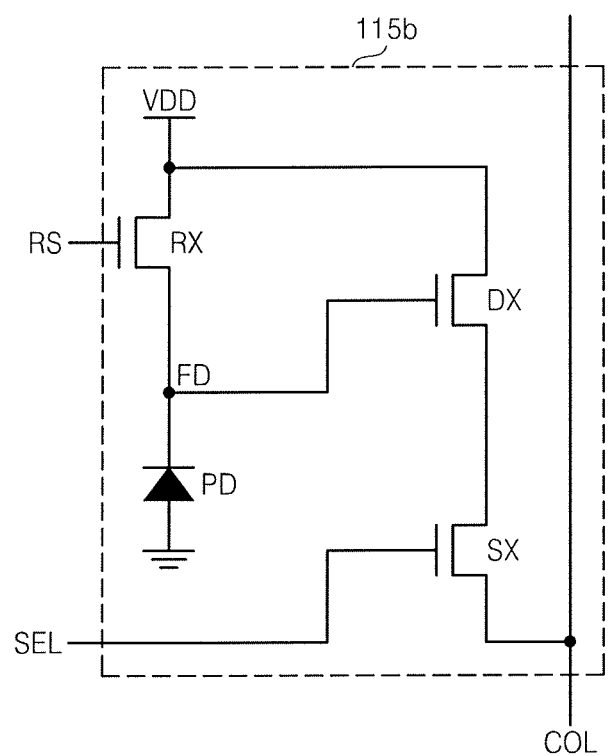

A unit pixel 115b illustrated in FIG. 2B is a unit pixel having a 3-transistor (3T) structure and includes a photo diode PD, a reset transistor Rx, a drive transistor Dx, and a selection transistor Sx. An optical charge generated by the photo diode PD is directly accumulated in a floating diffusion node FD, and a pixel signal is output to a column line through operations of the drive transistor Dx and the selection transistor Sx.

Figure 2C:
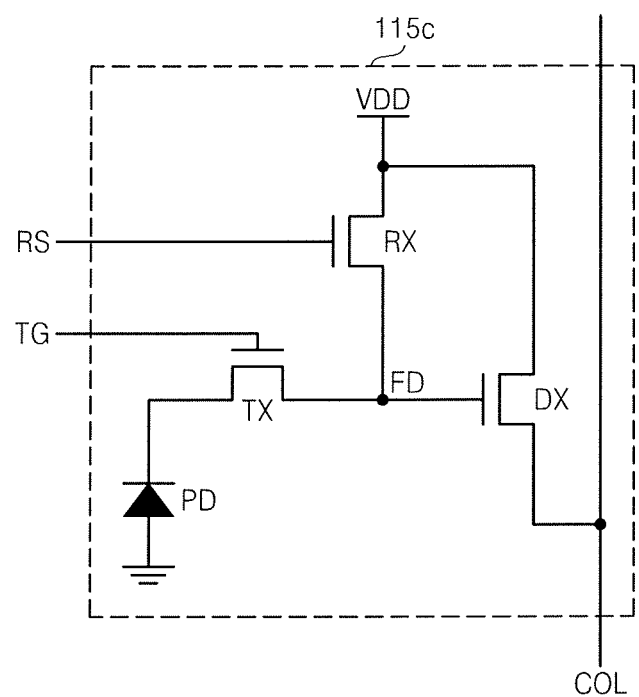

A unit pixel 115c illustrated in FIG. 2C is a unit pixel having a 3T structure and includes a photo diode PD, a transfer transistor Tx, a reset transistor Rx, and a drive transistor Tx. The reset transistor Rx may be embodied as an n-channel depression type transistor. The reset transistor Rx may reset a voltage of the floating diffusion node FD to a power supply voltage VDD or a row level voltage (e.g., 0 V), according to a reset control signal output from the row driver 120, and may thus perform an operation similar to that of the selection transistor Sx.

Figure 2D:
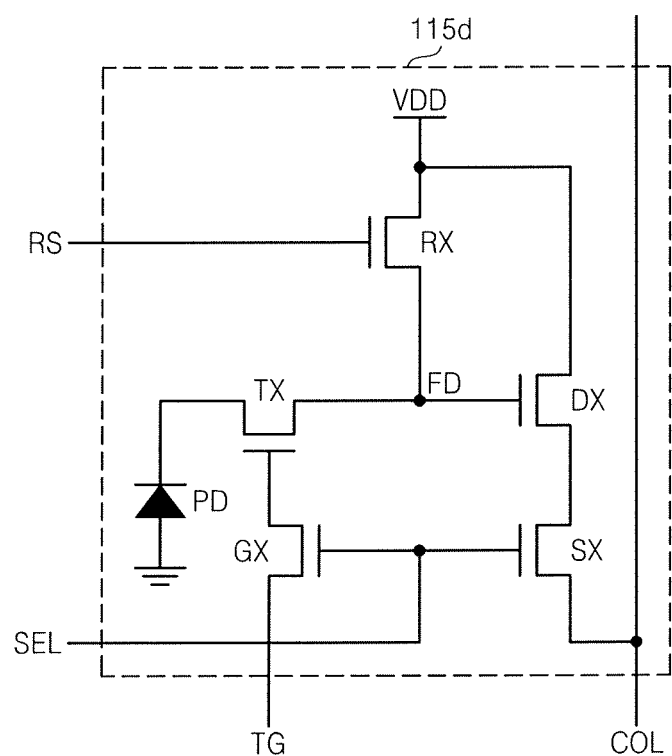

A unit pixel 115d illustrated in FIG. 2D is a unit pixel having a 5-transistor (5T) structure and includes a photo diode PD, a reset transistor Rx, a drive transistor Dx, and a selection transistor Sx. The unit pixel 115d further includes one transistor Gx. A selection signal SEL controls both transistor Gx and the selection transistor Sx.

Figure 2E:
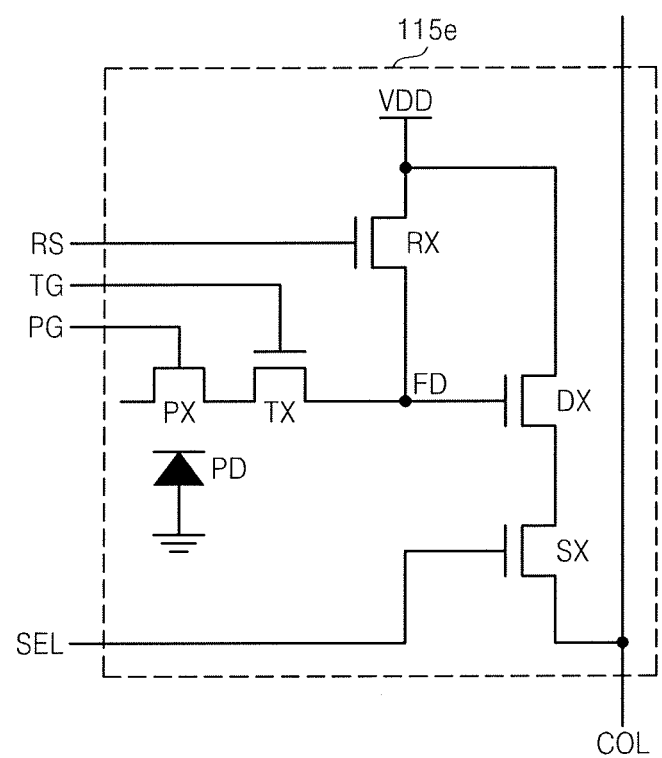

A unit pixel 115e illustrated in FIG. 2E is a unit pixel having a 5T structure and includes a photo diode PD, a reset transistor Rx, a drive transistor Dx, and a selection transistor Sx. The unit pixel 115e further includes one transistor Px controlled by a signal PG.

Figure 3:
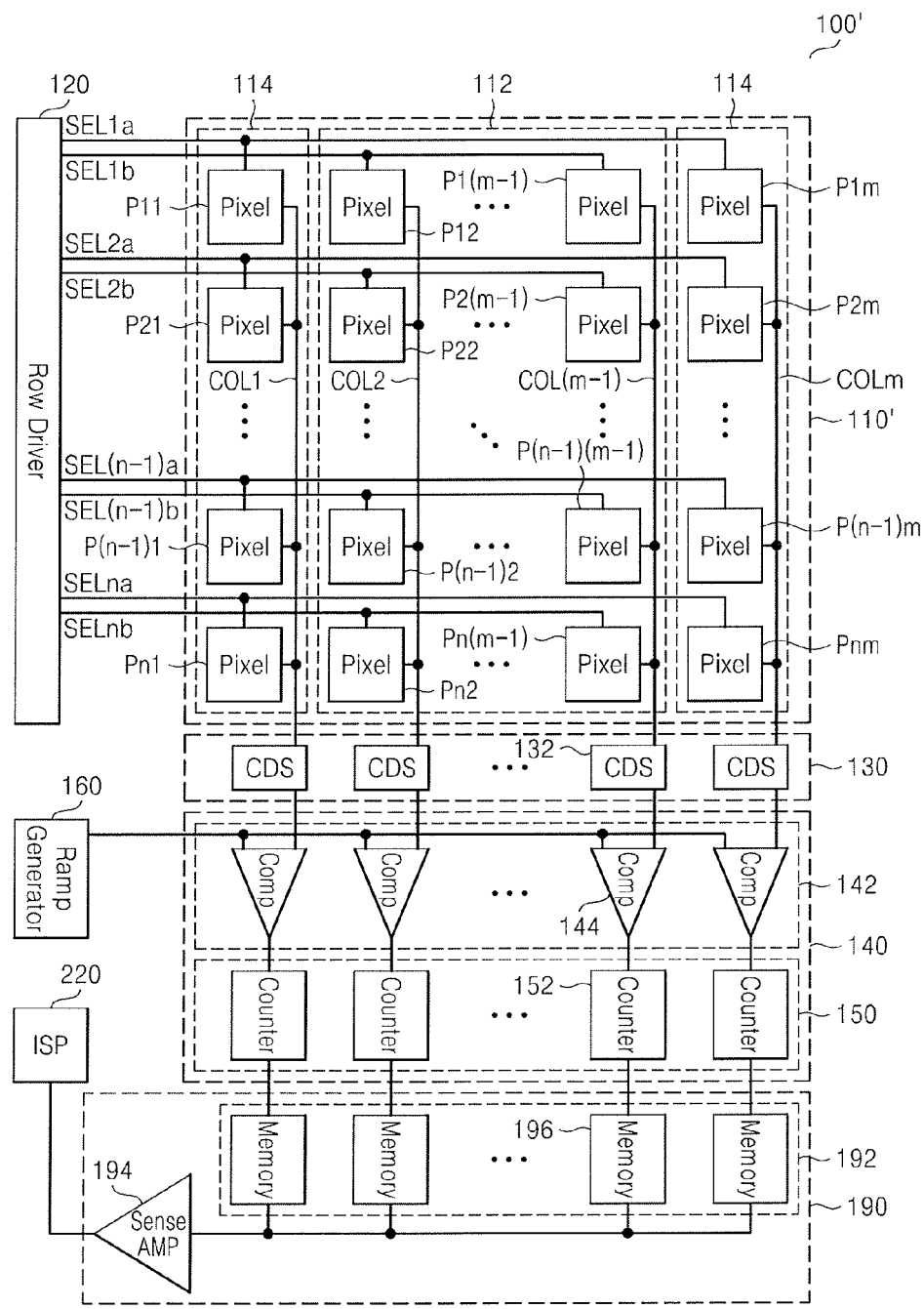
FIG. 3 is a detailed diagram of an image sensor according to an exemplary embodiment of the inventive concept.

FIG. 3 is a detailed diagram of an image sensor 100' according to an exemplary embodiment of the inventive concept.

Referring to FIGS. 1 to 3, the image sensor 100' includes a pixel array 110', a row driver 120, a CDS block 130, an analog-to-digital converter 140, a ramp signal generator 160, and a buffer 190. The analog digital converter 140 includes a comparison block 142 and a counter block 150.

The pixel array 110' may include a plurality of unit pixels, such as the unit pixels 115a to 115e illustrated in FIGS. 2A to 2E, which are arranged in a matrix and each connected to one of a plurality of row lines and one of a plurality of column lines.

Although not shown, the pixel array 110' may be formed by vertically stacking a semiconductor substrate, an interlayer insulating layer, a color filter layer, and micro lenses. The semiconductor substrate may be obtained by forming a p type epitaxial layer on a p type silicon substrate, and a photo diode may be formed by implanting n type ions into the p type epitaxial layer. Also, an interlayer insulating layer may be stacked on the semiconductor substrate. The interlayer insulating layer may include gates of transistors that form a unit pixel, and multiple layers of conductive lines. According to an exemplary embodiment of the inventive concept, a protective layer (not shown) is stacked on the interlayer insulating layer to protect devices. The color filter layer may be stacked on the interlayer insulating layer (or the protective layer) and may include a plurality of color filters. According to an exemplary embodiment of the inventive concept, bayer pattern technology is applied to the color filter layer. For example, color filters may include at least one red filter, at least one green filter, and at least one blue filter, or may include at least one magenta filter, at least one cyan filter, and at least one yellow filter. According to an exemplary embodiment of the inventive concept, a planarization layer (which is also referred to as an over-coating layer) is stacked on the color filter layer. The micro lenses may be stacked on the color filter layer (or the planarization layer), and may guide incident light to be effectively incident on the photo diode of a unit pixel.

The pixel array 110' includes an active pixel array 112 and a line-optical black (L-OB) pixel array 114. In an embodiment, the pixels of the active pixel array 112 are responsive to light, while the pixels of the L-OB pixel array 114 are unresponsive to light.

The active pixel array 112 includes a plurality of active pixels P12 to Pn(m−1). The plurality of active pixels P12 to Pn(m−1) may each include a red pixel for converting light of a red spectrum domain into an electrical signal, a green pixel for converting light of a green spectrum domain into an electrical signal, a blue pixel for converting light of a blue spectrum domain into an electrical signal, and a depth pixel for converting depth information into an electrical signal according to a time-of-flight (TOF) method. That is, the plurality of active pixels P12 to Pn(m−1) output pixel signals according to the intensity of incident light, respectively.

Figure 4:
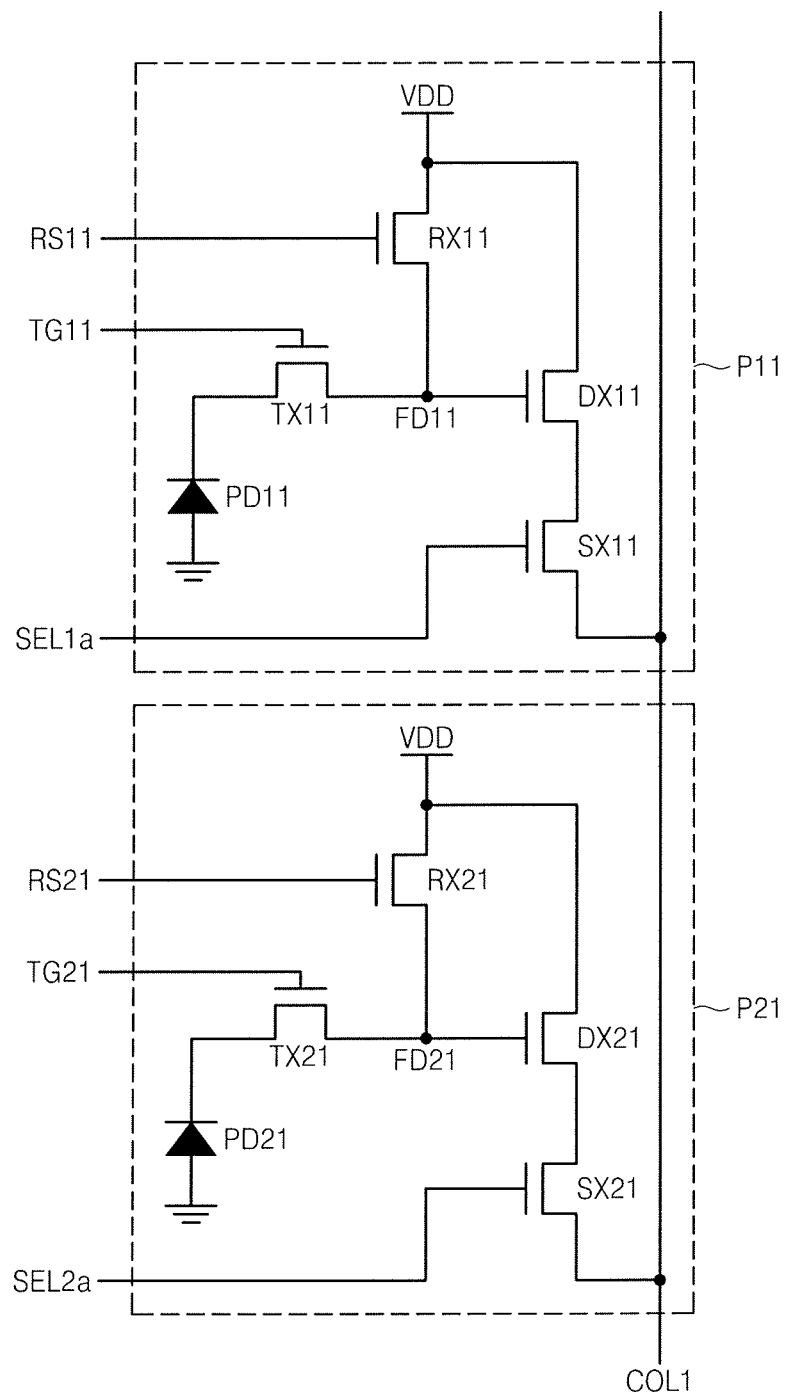
FIG. 4 is a detailed circuit diagram illustrating an operation of a pixel array of the image sensor of FIG. 3 according to an exemplary embodiment of the inventive concept.

The L-OB pixel array 114 includes a plurality of L-OB pixels P11 to Pn1 and P1m to Pnm. Although FIG. 4 illustrates that an L-OB pixel is formed only at left and right ends of each of rows, the inventive concept is not limited thereto and at least two L-OB pixels may be continuously or discontinuously formed in one row if needed. In the plurality of L-OB pixels P11 to Pn1 and P1m to Pnm, a photo diode is not included or a light-shielding film is formed on a layer corresponding to a color filter, unlike in the plurality of active pixels P12 to Pn(m−1). That is, the L-OB pixels P11 to Pn1 and P1m to Pnm may have the substantially the same structure as the active pixels P12 to Pn(m−1), and may generate a signal according to noise that is not related to incident light. In other words, the plurality of L-OB pixels P11 to Pn1 and P1m to Pnm may generate a dark-level offset signal containing row noise.

The row noise is noise contained in each of the pixel signals output from the active pixels P12 to Pn(m−1). The row noise may cause horizontal stripes to occur in a final image, and should be removed to improve image quality. The row noise occurs mainly due to a change in power supplied to the image sensor 100' or noise generated during driving of the row driver 120, etc., and has time-variant characteristics. The image signal processor 220 may generate a final pixel signal from which row noise is removed by subtracting the dark-level offset signal from the pixel signal. That is, the image signal processor 220 may remove row noise from the pixel signals by using auto dark-level compensation (ADLC) technology.

Since the row noise varies according to time, at least one L-OB pixel may be present in each of rows of the pixel array 110' to completely remove the row noise. That is, since pixel signals are output from the pixel array 100' in units of rows, dark-level offset signals that are simultaneously (or at substantially the same time) output in the same row may be subtracted from the pixel signals to effectively remove the row noise that varies according to time.

Also, a dark-level offset signal output from each of the plurality of L-OB pixels P11 to Pn1 and P1m to Pnm may contain not only the row noise but also pixel intrinsic noise. The pixel intrinsic noise occurs due to the structure of each of these pixels, and a value of the pixel intrinsic noise may vary according to a pixel. The value of the pixel intrinsic noise may range from '0' to a positive value (+) or a negative value (−). The greater the number of the L-OB pixels included in one row among the L-OB pixels P11 to Pn1 and P1m to Pnm that output the dark-level offset signals, the more an average of values of the pixel intrinsic noise may approximate to '0'. Thus, the more L-OB pixels included in one row, the less the pixel intrinsic noise, but a ratio of the size of the active pixel array 112 to the size of the entire pixel array 110' decreases. This may degrade the performance of the image sensor 100'. To prevent degradation of the performance of the image sensor 100', the number of L-OB pixels in each row is limited. Thus, during outputting of a pixel signal in one row (read-out operation), at least one of the plurality of L-OB pixels P11 to Pn1 and P1m to Pnm belonging to a different row are activated so that a dark-level offset signal is simultaneously (or at substantially the same time) output from the at least one of the plurality of L-OB pixels P11 to Pn1 and P1m to Pnm.

To this end, the active pixel array 112 and the L-OB pixel array 114 may individually include a conductive line via which a selection control signal is received from the row driver 120. In other words, the L-OB pixels P11 and P1m in the first row of the L-OB pixel array 114 may be activated when a first L-OB selection control signal SEL1a is input thereto, and the active pixels P12 to P1(m−1) in the first row of the active pixel array 112 may be activated when a first active selection control signal SEL1b is input thereto. Similarly, the L-OB pixels P21 to Pn1 and P2m to Pnm in the second to $n^{th}$ rows may be activated when second to $n^{th}$ L-OB selection control signals SEL2a to SELna are input thereto, respectively. Also, the active pixels P12 to Pn(m−1) in the second to $n^{th}$ rows may be activated when second to $n^{th}$ active selection control signals SEL2b to SELnb are input thereto, respectively.

Thus, the active pixels P12 to P1(m−1) and the L-OB pixels P11 and P1m belonging to the first row are activated when the first active selection control signal SEL1b and the first L-OB selection control signal SEL1a are input thereto. At the same time, the L-OB pixels P21 and P2m belonging to the second row are activated when the second L-OB selection control signal SEL2a is input thereto. That is, the L-OB pixels P11 and P1m and the L-OB pixels P21 and P2m in the first and second rows connected to the same column line are simultaneously (or at substantially the same time) activated to output dark-level offset signals, respectively.

When different dark-level offset signals are supplied to one column line COL1 or COLm, an output of the column line COL1 or COLm may have a value between levels of the different dark-level offset signals (pixel level averaging: PLA). When two signals having different levels are simultaneously supplied to the column line COL1 or COLm, an output of the column line COL1 or COLm may be determined to be substantially the same as a signal having a higher level among the two signals. The less the difference between the levels of the two signals, the more the value of the output of the column line COL1 or COLm may approximate to an average of the levels of the two signals. In general, since the difference between the levels of dark-level offset signals output from the L-OB pixels P11 to Pn1 and P1m to Pnm is a very small value, the value of the output of the column line COL1 or COLm may be determined to be simultaneously the same as the average of the levels of the dark-level offset signals.

That is, dark-level offset signals output from L-OB pixels belonging to one row, e.g., the L-OB pixels P11 and P1m, is digitized by the ADC block 140 and an average of the levels of the dark-level offset signals is calculated by the image signal processor 220. In contrast, an average of levels of dark-level offset signals output from L-OB pixels belonging to the same column, e.g., the L-OB pixels P11 and P21, are determined in an analog manner.

Thus, when L-OB pixels in the first and second rows connected to the same column line, e.g., the L-OB pixels P11 and P21 in the column line COL1, are simultaneously activated to output dark-level offset signals, respectively, an output of the same column line, e.g., the column line COL1 may be the same as an average of the levels of dark-level offset signals output from the respective L-OB pixels in the first and second rows, e.g., the L-OB pixels P11 and P21. Similarly, L-OB pixels in the $(k+1)^{th}$ row or the $(k-1)^{th}$ row adjacent to the $k^{th}$ row may be simultaneously activated during a read-out operation in the $k^{th}$ row. Here, 'k' denotes an integer ranging from '1' to 'n'.

Also, an L-OB pixel in a row (e.g., a row farthest from the row in which the read-out operation is performed) other than a row adjacent to a row in which the read-out operation is performed, may also be activated. However, the inventive concept is not limited thereto, and L-OB pixels in rows other than the row in which the read-out operation is performed may also be activated.

Although FIG. 3 illustrates that different selection control signals are input to activate pixels and L-OB pixels in one row, the inventive concept is not limited thereto and different L-OB selection control signals may be input to the L-OB pixels so that the number of L-OB pixels that are to be simultaneously activated may be controlled in one row. Also, although FIG. 3 illustrates that the L-OB pixels P11 to Pn1 and P1m to Pnm are present at both ends of one row, the inventive concept is not limited thereto and the numbers and locations of L-OB pixels included in one row are not limited.

Also, a filter array (not shown) that includes color filters or light-shielding films that transmit or block light of a specific spectrum domain may be disposed on each of the plurality of pixels P11 to Pnm of the pixel array 110'.

The row driver 120 may decode a row control signal (e.g., an address signal) generated by the timing generator 170, and select at least one row line among row lines of the pixel array 110' according to the decoded row control signal. As described above, the row driver 120 may select only L-OB pixels among active pixels and L-OB pixels in one row, e.g., may select L-OB pixels P21 and P2m among the L-OB pixels P21 to P2m.

The CDS block 130 performs CDS on a pixel signal and a dark-level offset signal output from a unit pixel connected to a column line among the column lines COL1 to COLm of the pixel array 110'. That is, the CDS 130 may sequentially receive an image signal and a reset signal that are included in the pixel signal and the dark-level offset signal and that change according to the brightness of external light, subtract the reset signal from the image signal, and then output the pixel signal and the dark-level offset signal from which the reset signal is removed. The CDS block 130 may include a plurality of CDS units 132 connected to the column lines COL1 to COLm, respectively.

The comparison block 142 includes a plurality of comparators 144. The plurality of comparators 144 are connected to the CDS block 130 and the ramp signal generator 160. In this case, the CDS block 130 may be connected to a first input terminal of each of the plurality of comparators 144 and the ramp signal generator 160 may be connected to a second input terminal of each of the plurality of comparators 144.

Each of the plurality of comparators 144 may receive and compare values of an output signal of the CDS block 130 and a ramp signal generated by the ramp signal generator 160, and output a comparison result signal via an output terminal thereof. In this case, the comparison result signal output from each of the plurality of comparators 144 may be output according to the inclination (e.g., slope) of the ramp signal when the difference between the image signal and the reset signal is picked up. The ramp signal generator 160 may be operated based on a control signal generated by the timing generator 170.

The counter block 150 includes a plurality of counters 152, and the plurality of counters 152 are connected to output terminals of the plurality of comparators 144, respectively. The counter block 150 may be operated under control of the counter controller 171 of FIG. 1. Although FIG. 1 illustrates that the counter controller 171 is disposed outside the timing generator 170, the inventive concept is not limited thereto and the counter controller 171 may be disposed inside the counter block 150 or inside the timing generator 170.

Each of the plurality of counters 152 may include an up/down counter and a bit-wise counter. The bit-wise counter performs operations similar to those of the up/down counter. For example, the bit-wise counter is capable of performing up-counting, and inverting all bits therein to 1's complements when a specific signal is input to the bit-wise counter. By using these functions, reset counting is performed and a performing result is inverted to a 1's complement, e.g., a negative value.

The buffer 190 includes a column memory block 192 and a sense amplifier 194. The column memory block 192 includes a plurality of memories 196.

The memories 196 may be operated according to a memory control signal generated by a memory controller (not shown) disposed in the column memory block 192 or in the timing generator 170 or based on a control signal generated by the timing generator 170. The memories 196 may be static random access memories (SRAMs).

The column memory block 192 temporarily stores digital signals that are counted by and output from the plurality of counters 152, and outputs the digital signals to the sense amplifier 194, according to the memory control signal. The sense amplifier 194 senses and amplifies the digital signals, and outputs the amplified digital signals to the image signal processor 220.

According to an exemplary embodiment of the inventive concept, at least two CDS units 132, at least two comparators 144, at least two counters 152, and/or at least two memories 196 are present in each of the column lines COL1 and COLm connected to L-OB pixels. This is to remove intrinsic noise that may also occur in the CDS units 132, the comparators 144, the counters 152, and the memories 196.

Accordingly, in an image sensor according to an exemplary embodiment of the inventive concept, the number of L-OB pixels contributing to a read-out operation in one row may be increased without increasing the size of a pixel array, thereby effectively reducing pixel intrinsic noise.

FIG. 4 is a detailed circuit diagram illustrating an operation of the pixel array 110' of the image sensor 100' of FIG. 3 according to an exemplary embodiment of the inventive concept.

Referring to FIGS. 1 to 4, the L-OB pixel P11 is present in the first row connected to the first column line COL1, and the L-OB pixel P21 is present in the second row connected to the first column line COL1. The L-OB pixels P11 and P21 may each have a 4T structure illustrated in FIG. 2A, as an example. However, the L-OB pixels P11 and P21 are not limited thereto and may have a structure in which a photo diode is not included or may have a 3T or 5T structure.

The L-OB pixel P11 in the first row connected to the first column line COL1 receives a transmission control signal TG11, a reset signal RS11, and a selection control signal SEL1a from the row driver 120, transmits a charge to a floating diffusion node FD11, and performs resetting and a read-out operation. The L-OB pixel P21 in the second row connected to the first column line COL1 receives a transmission control signal TG21, a reset signal RS21, and a selection control signal SEL2a from the row driver 120, transmits a charge to a floating diffusion node FD21, and performs resetting and a read-out operation. The transmission control signals TG11 and TG21, the reset signals RS11 and RS21, and the selection control signals SEL1a and SEL2a may be controlled in manner similar to a transmission control signal, a reset signal, and a selection control signal input to a first row of the active pixel array 112.

Thus, during the read-out operation in the first row, the L-OB pixel P11 and the L-OB pixel P21 in the respective first and second rows connected to the first column line COL1 may simultaneously (or at substantially the same time) output dark-level offset signals. In this case, since both outputs of the L-OB pixel P11 in the first row and the L-OB pixel P21 in the second row are supplied to the first column line COL1, an output of the first column line COL1 may be determined to be substantially the same as an average of levels of the dark-level offset signals output from the L-OB pixel P11 in the first row and the L-OB pixel P21 in the second row.

In other words, during the read-out operation in the first row, when the L-OB pixel P11 and the L-OB pixel P21 in the respective first and second rows connected to the same column line COL1 are simultaneously (or at substantially the same time) activated to output dark-level offset signals, respectively, the output of the column line COL1 may be the same as an average of levels of dark-level offset signals output from the L-OB pixels P11 and P1$m$ in the first row and the L-OB pixels P21 and P2$m$ in the second row, which are connected to the same column line.

Figure 5:
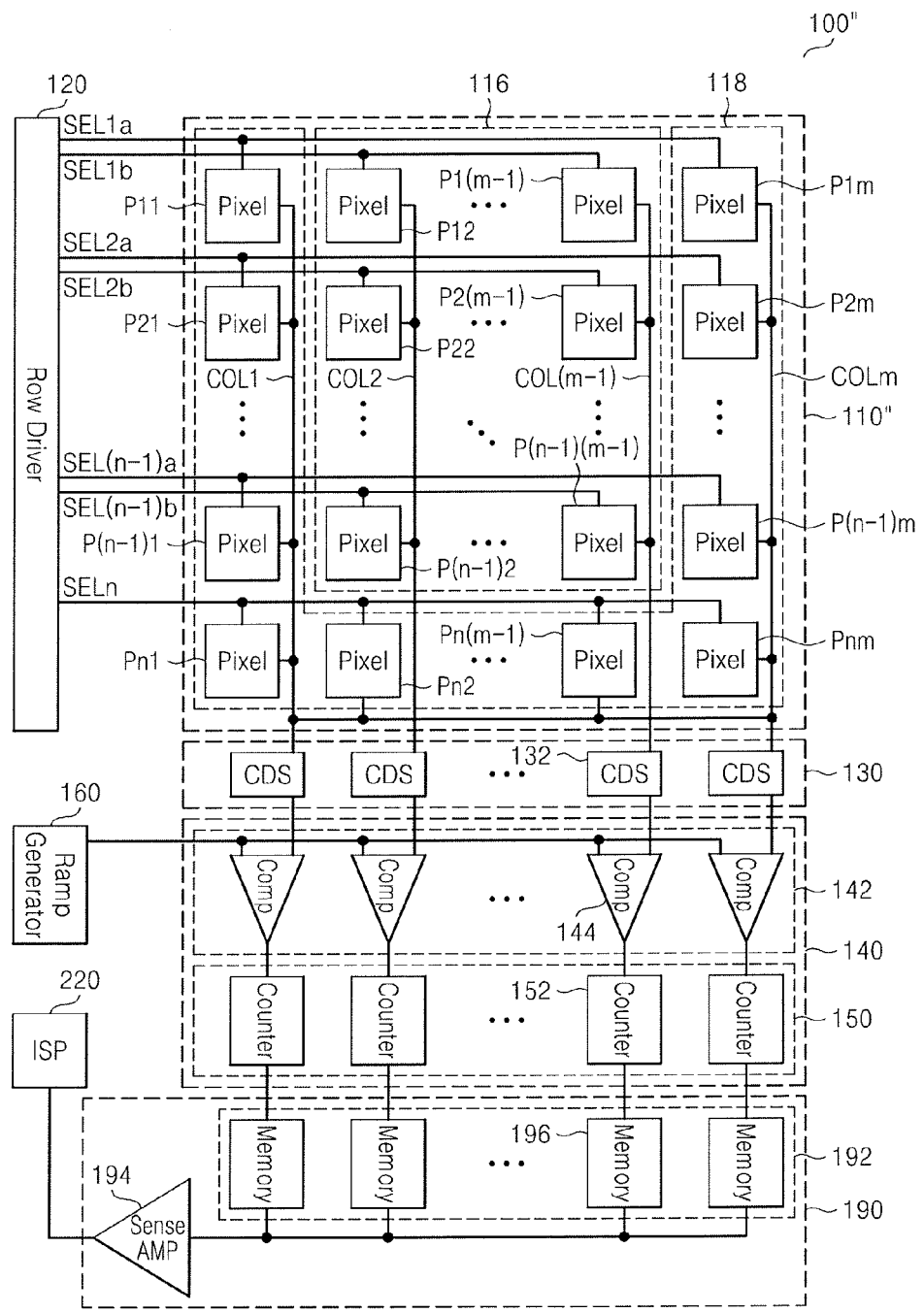
FIG. 5 is a detailed diagram of an image sensor according to an exemplary embodiment of the inventive concept.

FIG. 5 is a detailed diagram of an image sensor 100" according to an exemplary embodiment of the inventive concept.

Referring to FIGS. 1 to 5, the image sensor 100" according to an exemplary embodiment of the inventive concept has the same structure as the image sensor 100' of FIG. 3 and will thus be described by focusing on the differences therebetween.

In a pixel array 110" included in the image sensor 100", only L-OB pixels Pn1 to Pnm are present in an $n^{th}$ row, unlike in the pixel array 110' of FIG. 3. Active pixels P12 to P1($m$–1) and L-OB pixels P11 and P1$m$ in a first row are activated when a first active selection control signal SEL1$b$ is input to the active pixels P12 to P1($m$–1) and a first L-OB selection control signal SEL1$a$ is input to the L-OB pixels P11 and P1$m$. At the same time, the m L-OB pixels Pn1 to Pnm belonging to the $n^{th}$ row receive an $n^{th}$ L-OB selection control signal SELn and are thus activated. Since only the L-OB pixels Pn1 to Pnm belong to the $n^{th}$ row, conductive lines may be configured to receive the same $n^{th}$ L-OB selection control signal SELn from the row driver 120, unlike in the first to (n–1)$^{th}$ rows. Also, all outputs of the m L-OB pixels Pn1 to Pnm belonging to the $n^{th}$ row are supplied to the first column line COL1 and the $m^{th}$ column line COLm.

During a read-out operation in the first row, the L-OB pixels P11 and P1$m$ in the first row and the L-OB pixels Pn1 to Pnm in the $n^{th}$ row are simultaneously activated to output dark-level offset signals, respectively. Thus, outputs of the first column line COL1 and the $m^{th}$ row column line COLm may correspond to an average of the levels of the dark-level offset signals output from the L-OB pixels P11 and P1$m$ in the first row and the L-OB pixels Pn1 to Pnm in the $n^{th}$ row. Consequently, the number of L-OB pixels contributing to the read-out operation in the first row increases by the number 'm' of L-OB pixels in the $m^{th}$ row, thereby reducing pixel intrinsic noise.

During read-out operations in second to (n–1)$^{th}$ rows, the L-OB pixels Pn1 to Pnm in the $n^{th}$ row are also activated to output dark-level offset signals. Thus, the number of L-OB pixels contributing in each of rows increases, thereby reducing pixel intrinsic noise.

Although FIG. 5 illustrates that all pixels belonging to the $n^{th}$ row are the L-OB pixels Pn1 to Pnm, there may be a plurality of rows to which only L-OB pixels belong. For example, one or more additional rows, which only contain L-OB pixels may be present adjacent the one illustrated $n^{th}$ row.

Figure 6:
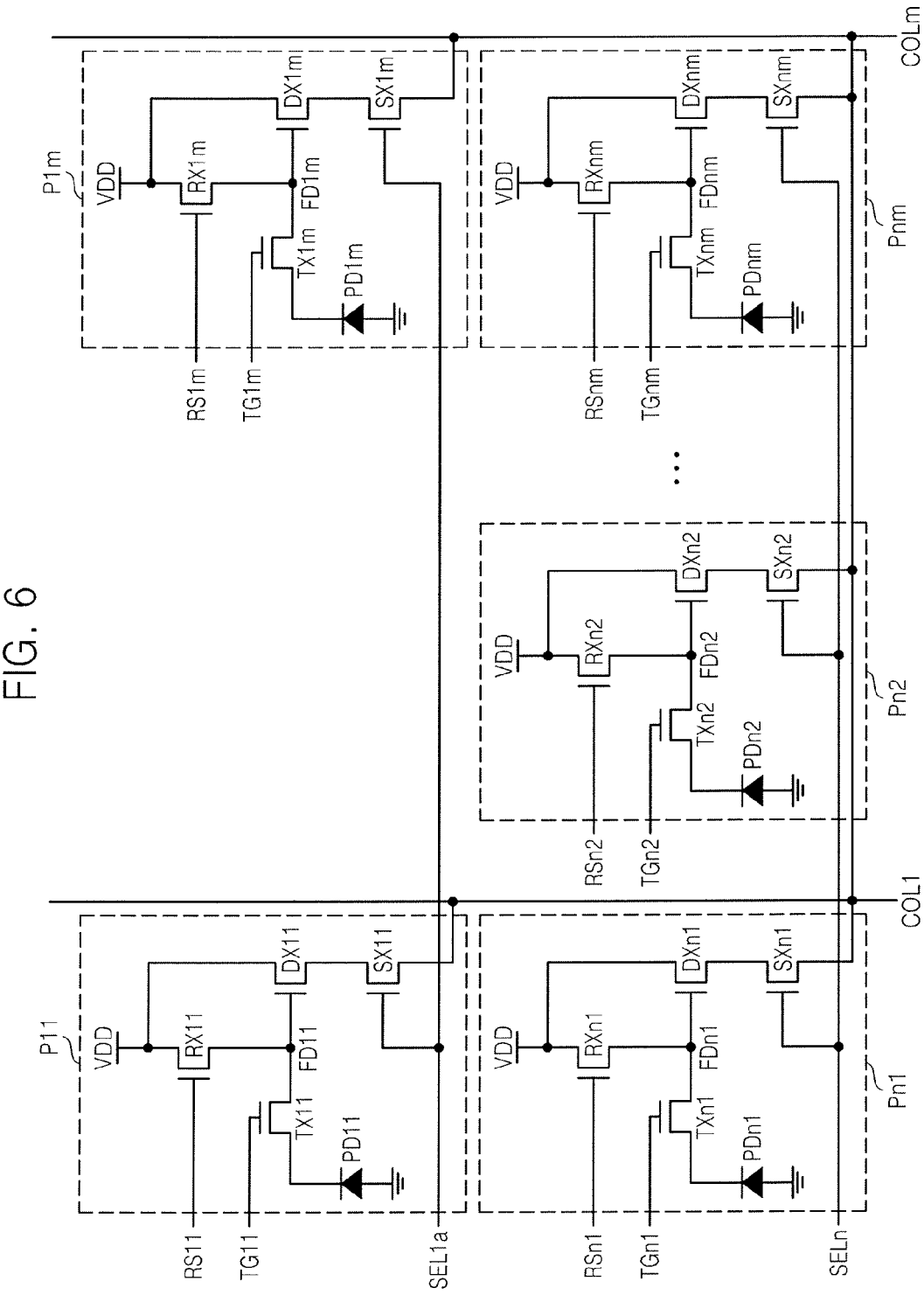
FIG. 6 is a detailed circuit diagram of a pixel array of the image sensor of FIG. 5 according to an exemplary embodiment of the inventive concept.

FIG. 6 is a detailed circuit diagram of the pixel array 110" of the image sensor 100" of FIG. 5 according to an exemplary embodiment of the inventive concept.

Referring to FIGS. 1 to 6, L-OB pixels P11 and P1$m$ are present in a first row connected to a first column line COL1 and an $m^{th}$ column line COLm, and L-OB pixels Pn1 to Pnm are present in an $n^{th}$ row connected to the first column line COL1 and the $m^{th}$ column line COLm. The L-OB pixels P11 and P1$m$ and Pn1 to Pnm may each have the 4T unit pixel structure illustrated in FIG. 2A, as an example. However, the L-OB pixels P11 and P1$m$ and Pn1 to Pnm are not limited thereto and may have a structure in which a photo diode is not included or may have the 3T or 5T unit pixel structure.

The L-OB pixels P11 and P1$m$ in the first row connected to the first column line COL1 and the $m^{th}$ column line COLm receive transmission control signals TG11 and TG1$m$, respectively, reset signals RS11 and RS1$m$, respectively, and a common selection control signal SEL1$a$ from the row driver 120, transmit a charge to floating diffusion nodes FD11 and FD1$m$, respectively, and perform resetting and a read-out operation. The L-OB pixels Pn1 to Pnm in the $n^{th}$ row connected to connected to the first column line COL1 and the $m^{th}$ column line COLm receive transmission control signals TGn1 to TGnm, respectively, reset signals RSn1 to RSnm, respectively, and a common selection control signal SELn from the row driver 120, transmit a charge to floating diffusion nodes FDn1 to FDnm, and perform resetting and a read-out operation. The transmission control signals TG11, TG1$m$, and TGn1 to TGnm, the reset signals RS11, RS1$m$, and RSn1 to RSnm, and the selection control signals SEL1$a$ and SELn may be controlled in a manner similar to a transmission control signal (not shown), a reset signal (not shown), and a selection control signal SELa1 input to a first row of an active pixel array 116.

Thus, during the read-out operation in the first row, the L-OB pixels P11 and P1$m$ in the first row and the L-OB pixels Pn1 to Pnm in the $n^{th}$ row may simultaneously output dark-level offset signals. In this case, since outputs of the L-OB pixels P11 and P1m in the first row and the L-OB pixels Pn1 to Pnm in the $n^{th}$ row are supplied to the first column line COL1 and the $m^{th}$ column line COLm, outputs of the first column line COL1 and the $m^{th}$ column line COLm may be determined to be substantially the same as an average of levels of the dark-level offset signals output from the L-OB pixels P11 and P1m in the first row and the L-OB pixels Pn1 to Pnm in the $n^{th}$ row.

In other words, during the read-out operation in the first row, when the L-OB pixels P11 and P1m in the first row and the L-OB pixels Pn1 to Pnm in the $n^{th}$ row that are connected to the first column line COL1 and the $m^{th}$ column line COLm are simultaneously activated to output dark-level offset signals, respectively, the outputs of the first column line COL1 and the $m^{th}$ column line COLm may be the same as an average of levels of the dark-level offset signals output from the L-OB pixels P11 and P1m in the first row and the L-OB pixels Pn1 to Pnm in the $n^{th}$ row that are connected to the same column lines COL1 and COLm.

Although a case in which only L-OB pixels are present in only the $n^{th}$ row has been described above with reference to FIGS. 5 and 6, the inventive concept is not limited thereto and additional rows with only L-OB pixels may be present in at least one of the first to $n^{th}$ rows.

Figure 7:
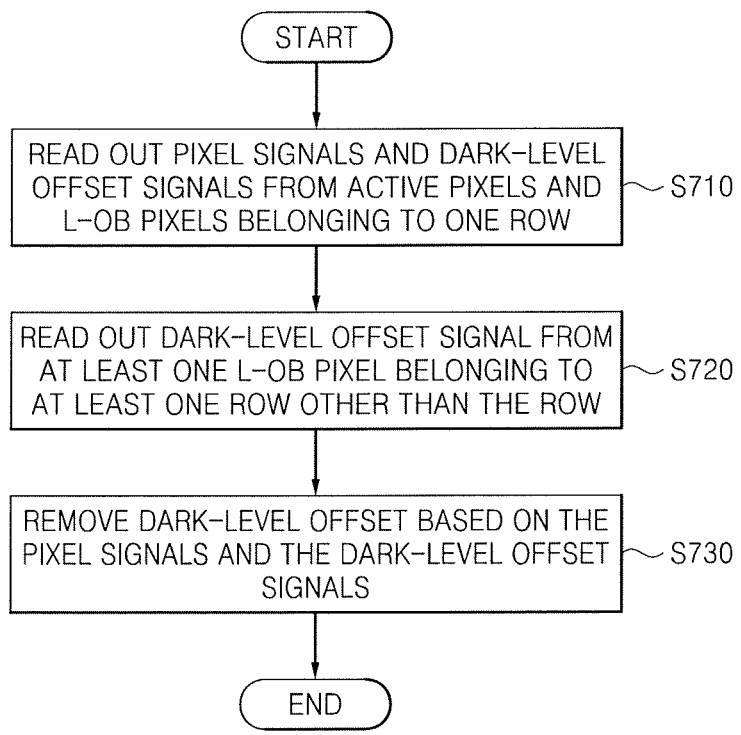
FIG. 7 is a flowchart illustrating a method of operating an image sensor according to an exemplary embodiment of the inventive concept.

FIG. 7 is a flowchart illustrating a method of operating an image sensor according to an exemplary embodiment of the inventive concept.

Referring to FIGS. 1 to 7, when a read-out operation is performed with respect to one row, each of active pixels (e.g., responsive to light for outputting a pixel signal) and each of L-OB pixels that belong to the one row are activated according to a first active selection control signal and a first L-OB selection control signal to output a pixel signal and a dark-level offset signal, respectively (S710).

Simultaneously with the read-out operation with respect to the one row, a read-out operation is performed on at least one L-OB pixel belonging to at least one row other than the one row (S720). That is, at least two L-OB pixels connected to a column line may be simultaneously activated. Thus, a signal having a level that is substantially the same as an average of levels of dark-level offset signals output from the at least two L-OB pixels is output from the column line.

Then, reset offsets are removed from pixel signals and dark-level offset signals output from the respective column lines COL1 to COLm connected to the pixel array 110 by the CDS block 130 (S730). The resultant signals may be digitized by the ADC block 140 and be amplified by the buffer 190, and an image signal having no or reduced row noise and no or reduced pixel intrinsic noise may be then generated by the image signal processor 220.

Figure 8:
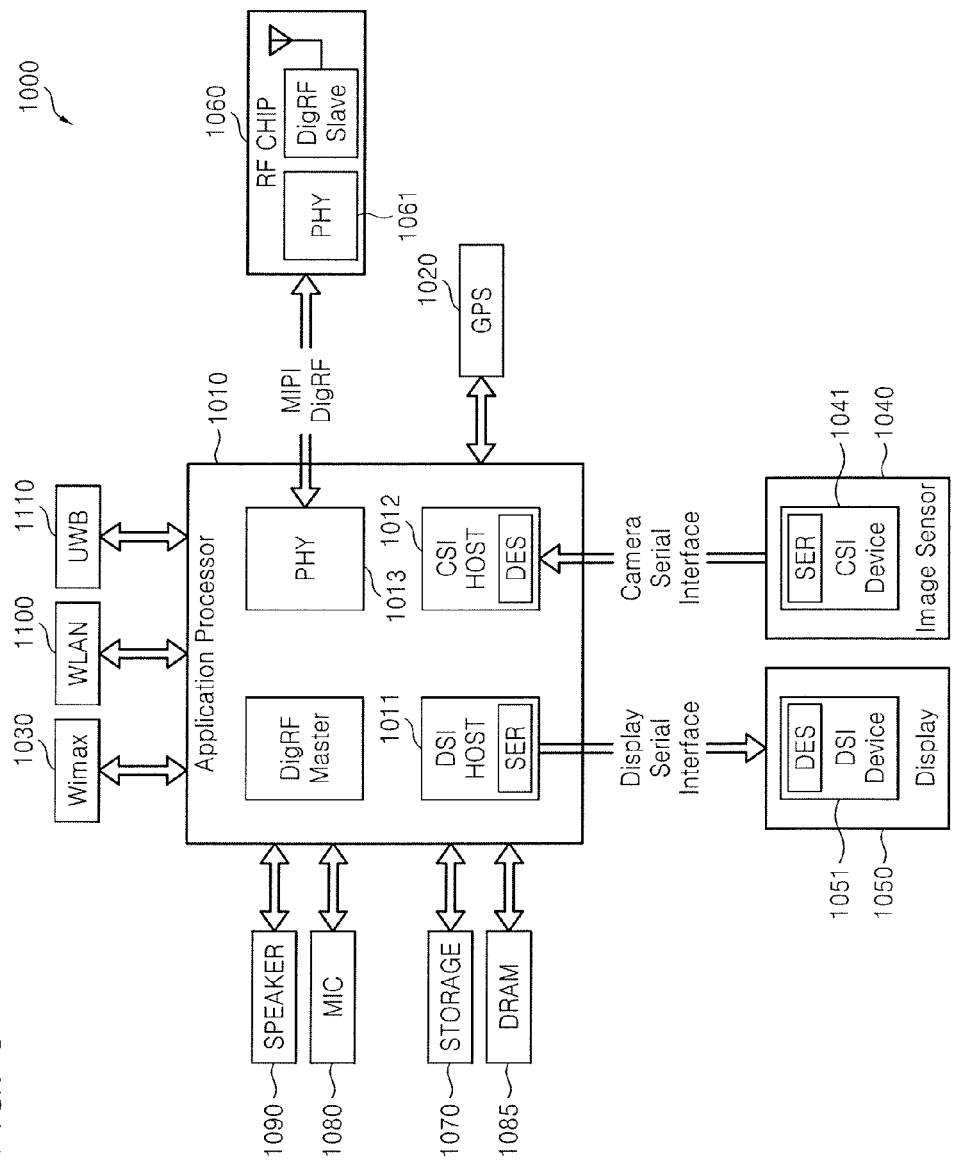
FIG. 8 is a block diagram of an electronic system including an image sensor according to an exemplary embodiment of the inventive concept.

FIG. 8 is a block diagram of an electronic system including an image sensor according to an exemplary embodiment of the inventive concept. The electronic system 1000 may be implemented by a data processing apparatus, such as a mobile phone, a personal digital assistant (PDA), a portable media player (PMP), an IP TV, or a smart phone that can use or support the mobile industry processor MIPI interface. The electronic system 1000 includes an application processor 1010, an image sensor 1040, and a display 1050.

A camera serial interface (CSI) host 1012 included in the application processor 1010 performs serial communication with a CSI device 1041 included in the image sensor 1040 through CSI. For example, an optical de-serializer may be implemented in the CSI host 1012, and an optical serializer may be implemented in the CSI device 1041.

A display serial interface (DSI) host 1011 included in the application processor 1010 performs serial communication with a DSI device 1051 included in the display 1050 through DSI. For example, an optical serializer may be implemented in the DSI host 1011, and an optical de-serializer may be implemented in the DSI device 1051.

The electronic system 1000 may also include a radio frequency (RF) chip 1060, which communicates with the application processor 1010. A physical layer (PHY) 1013 of the electronic system 1000 and a PHY of the RF chip 1060 communicate data with each other according to a MIPI DigRF standard. The electronic system 1000 may further include at least one element among a global positioning system GPS 1020, a storage device 1070, a microphone 1080, a dynamic random access memory DRAM 1085 and a speaker 1290. The electronic system 1000 may communicate using Worldwide Interoperability for Microwave Access Wimax 1030, wireless local area network WLAN 1100 or universal serial bus USB 1110, etc.

Figure 9:
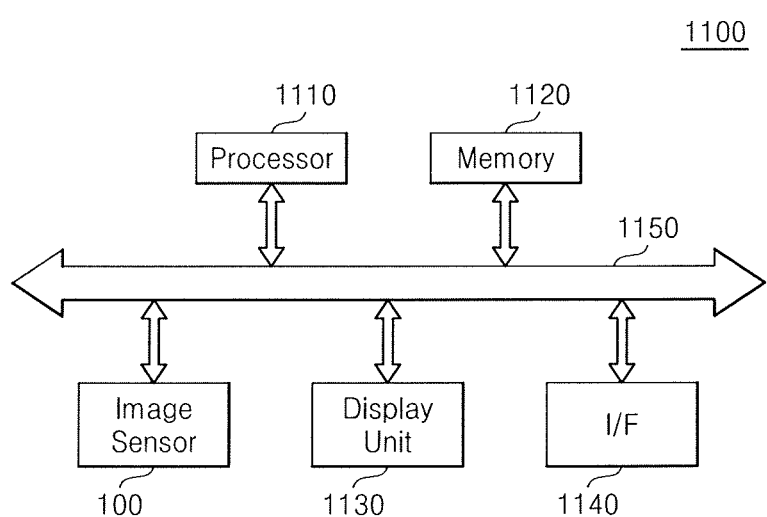
FIG. 9 is a block diagram of an image processing system 1100 including an image sensor according to an exemplary embodiment of the inventive concept.

FIG. 9 is a block diagram of an image processing system 1100 including an image sensor according to an exemplary embodiment of the inventive concept. Referring to FIG. 9, the image processing system 1100 includes a processor 1110, a memory 1120, the image sensor 100, a display unit 1130, and an interface 1140.

The processor 1100 may control the operation of the image sensor 100. For example, the processor 1110 may generate two-dimensional or three-dimensional image based on depth information and color information (e.g., at least one among red, green, blue, magenta, cyan and yellow information).

The memory 1120 may store a computer program for controlling the operation of the image sensor 100 and the two-dimensional or three-dimensional image via a bus 1150 according to control of the processor 1110. The processor 1110 may access the memory 1120 to execute the program. For example, the memory 1120 may be implemented by a non-volatile memory.

The image sensor 100 may generate the two-dimensional or three-dimensional image based on each of digital pixel signals (e.g., depth information and color information) according to control of the processor 1110.

The display unit 1130 may receive the generated image from the processor 1110 or the memory 1120 and display the received image through a display panel (e.g., liquid crystal display LCD, active-matrix organic light-emitting diode AMOLED).

The interface 1140 may be implemented as an interface for inputting/outputting the two-dimensional or three-dimensional image. According to an exemplary embodiment, the interface 1140 is a wireless interface.

The present general inventive concept can also be embodied as computer-readable codes on a computer-readable medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices.

The computer-readable recording medium can also be distributed over network coupled computer systems so that the computer-readable code is stored and executed in a distributed fashion. Also, functional programs, codes, and code segments to accomplish the present general inventive concept can be developed.

In an image sensor according to an exemplary embodiment of the inventive concept, the number of L-OB pixels contributing to a read-out operation with respect to a row may be increased without increasing the size of a pixel array, thereby effectively reducing pixel intrinsic noise.

Any one of the above-described image sensors may be embodied as a CMOS image sensor or a CCD image sensor.

While the inventive concept has been particularly shown and described with reference to exemplary embodiments thereof, it will be understood that various changes in form and details may be made therein without departing from the spirit and scope of the disclosure.

What is claimed is:

1. An image sensor comprising:
a pixel array comprising at least one active pixel and at least one line-optical black (L-OB) pixel arranged in a matrix including first to $n^{th}$ rows and first to $m^{th}$ columns, the pixel array configured to output a pixel signal and a dark-level offset signal in units of columns during a read-out operation in one of the first to $n^{th}$ rows;
a row driver configured to output a selection control signal comprising a first selection control signal and second selection control signal to the first to $n^{th}$ rows; and
an analog-to-digital converter (ADC) block configured to digitize the pixel signal and the dark-level offset signal,
wherein in the pixel array, a dark-level offset signal is output from an L-OB pixel in a first one of the rows simultaneously with a pixel signal generated during the read-out operation in a second other one of the rows when the row driver simultaneously applies the first selection control signal to a first conductive line connected to the L-OB pixel and the second selection control signal to a second conductive line connected to one of the active pixels involved in the read-out operation, and
wherein 'n' and 'm' each denote an integer that is equal to or greater than '2'.

2. The image sensor of claim 1, wherein only active pixels or L-OB pixels are present in at least one of the first to $m^{th}$ columns.

3. The image sensor of claim 1, wherein, when dark-level offset signals are simultaneously output from at least two L-OB pixels present in different rows and the same column, the pixel array outputs an average of values of the dark-level offset signals.

4. The image sensor of claim 3, wherein the at least two L-OB pixels that are present in the same column and that simultaneously output the dark-level offset signals are included in adjacent rows.

5. The image sensor of claim 1, wherein the at least one L-OB pixel does not comprise a photo diode.

6. The image sensor of claim 1, wherein the at least one L-OB pixel comprises a light-shielding film on a top surface thereof.

7. The image sensor of claim 1, wherein the ADC block comprises a plurality of ADC units connected to one of the first to $m^{th}$ columns.

8. The image sensor of claim 1, wherein the at least one active pixel and the at least one L-OB pixel each has one of a three-transistor (3T) structure, a four-transistor (4T) structure, and a five-transistor (5T) structure.

9. An image sensor comprising:
a pixel array including at least one active pixel and at least one line-optical black (L-OB) pixel arranged in a matrix including first to $n^{th}$ rows and first to $m^{th}$ columns, the pixel array configured to output a pixel signal and a dark-level offset signal in units of columns during a read-out operation in one of the first to $n^{th}$ rows;
a row driver configured to output a selection control signal comprising a first selection signal and a second selection signal to the first to $n^{th}$ rows; and
an analog-to-digital converter (ADC) block configured to digitize the pixel signal and the dark-level offset signal,
wherein in the pixel array, a dark-level offset signal is output from an L-OB pixel in a first one of the rows simultaneously with a pixel signal generated during the read-out operation in a second other one of the rows when the row driver simultaneously applies the first selection signal to a first conductive line connected to the L-OB pixel and the second selection signal to a second conductive line connected to one of the active pixels involved in the read-out operation,
wherein only L-OB pixels are present in one of the first to $n^{th}$ rows, and
wherein 'n' and 'm' each denote an integer that is equal to or greater than '2'.

10. The image sensor of claim 9, wherein only L-OB pixels are present in one of the first to $m^{th}$ columns.

11. The image sensor of claim 10, wherein an output of one of the first to $n^{th}$ rows in which only the L-OB pixels are present is supplied to one of the first to $m^{th}$ columns in which only L-OB pixels are present.

12. The image sensor of claim 9, wherein, when dark-level offset signals are simultaneously output from at least two L-OB pixels present in different rows and the same column, the pixel array outputs an average of values of the dark-level offset signals.

13. The image sensor of claim 9, wherein the at least one L-OB pixel comprises a light-shielding film on a top surface thereof.

14. The image sensor of claim 9, wherein the ADC block comprises a plurality of ADC units connected to one of the first to $m^{th}$ columns.

15. The image sensor of claim 9, further comprising:
a correlated double sampling (CDS) block configured to perform CDS on the pixel signal and the dark-level offset signal output in units of columns from the pixel array, and transmit a result of the performing to the ADC block;
a buffer configured to temporarily store, amplify, and output the digitized pixel signal and dark-level offset signal; and
a timing generator configured to generate a clock signal and a control signal, and transmit the clock signal and the control signal to the row driver and the ADC block.

16. An image process system comprising:
the image sensor of claim 15; and
an image signal processor configured to receive the amplified digitized pixel signal and dark-level offset signal from the buffer, and remove row noise by subtracting the amplified digitized dark-level offset signal from the amplified digitized pixel signal.

17. An image sensor comprising:
a pixel array comprising at least four pixels arranged in rows and columns,
wherein the pixels in a first one of the columns are configured to be unresponsive to light and output a dark-level offset signal when activated,
wherein the pixels in a second one of the pixel columns are configured to be responsive to light and output a pixel signal when activated; and
a controller configured to perform a read-out operation on one of the rows by applying a first selection signal to a first conductive line connected to the pixel of the one row for activating the pixels of the one row to generate the pixel signal while applying a second selection signal to a second conductive line connected to one of the pixels that is unresponsive to light located in the second other one of the rows for activating the one of the pixels that is unresponsive to light located in the second other one of the rows to generate the dark-level offset signal for output of the pixel signal together with the dark-level offset signal.

18. The image sensor of claim 17, wherein all the activated pixels are activated at substantially the same time.

19. The image sensor of claim 17, further comprising an analog-to-digital converter configured to digitize the pixel signal and the dark-level offset signal.

20. An image process system comprising:
the image sensor of claim 19; and
an image signal processor configured to receive the digitized pixel signal and dark-level offset signal, and remove noise by subtracting the digitized dark-level offset signal from the digitized pixel signal.

21. The image sensor of claim 17, wherein the pixels responsive to light each comprise a photo diode and the pixels unresponsive to light either exclude the photo diode or comprise a light shield.

22. The image sensor of claim 17, further comprising a circuit configured to perform a correlated double sampling on the pixel signal and the dark-level offset signal.

23. An image sensor comprising:
a pixel array comprising at least four pixels arranged in rows and columns,
wherein the pixels in a first one of the rows sequentially comprises a first pixel configured to be unresponsive to light and a second pixel configured to be responsive to light,
wherein the pixels in a second one of the rows are all configured to be unresponsive to light,
wherein the pixels responsive to light are configured to output a pixel signal and the pixels unresponsive to light are configured to output a dark-level offset signal, when activated respectively; and
a controller configured to perform a read-out operation on the first row by applying a first control signal to a first conductive line connected to all the pixel of the first row for activating all the pixels of the first row to generate the pixel signal while applying a second control signal to a second conductive line connected to all of the pixels of the second row for activating all of the pixels of the second row to generate the dark-level offset signal for output of the pixel signal together with the dark-level offset signal.

24. The image sensor of claim 23, wherein all the activated pixels are activated at substantially the same time.

25. The image sensor of claim 23, further comprising an analog-to-digital converter configured to digitize the pixel signal and the dark-level offset signal.

26. An image process system comprising:
the image sensor of claim 25; and
an image signal processor configured to receive the digitized pixel signal and dark-level offset signal, and remove noise by subtracting the digitized dark-level offset signal from the digitized pixel signal.

27. The image sensor of claim 23, wherein the pixels responsive to light each comprise a photo diode and the pixels unresponsive to light either exclude the photo diode or comprise a light shield.

28. The image sensor of claim 23, further comprising a circuit configured to perform a correlated double sampling on the pixel signal and the dark-level offset signal.

* * * * *